UNITED STATES PATENT OFFICE.

SCOTT MIXER, OF CINCINNATI, OHIO.

MANUFACTURE OF ARTIFICIAL STONE OR MARBLE.

SPECIFICATION forming part of Letters Patent No. 326,317, dated September 15, 1885.

Application filed March 30, 1885. (No specimens.)

*To all whom it may concern:*

Be it known that I, SCOTT MIXER, of Cincinnati, in Hamilton county and State of Ohio, have invented certain new and useful Improvements in the Manufacture of Artificial Stone or Marble, of which the following is a specification.

My invention relates to the production of imitations of different varieties of marble or stone. These productions possess great strength, hardness, and durability.

I first dissolve in one hundred gallons of water the following substances in substantially the proportions given: soda-alum or potash-alum, four pounds; salt of sodium, preferably bicarbonate of sodium, four pounds; soluble glass, three and one-half pounds; bichromate of potash, two pounds; ferrous sulphate, two pounds. I then mix with this solution a mixture consisting of or about four pounds each of glycerine and litharge. The resulting mixture I term the "solution."

The peculiar properties of the glycerine and litharge, in connection with the foregoing solution, cause the stone to become extremely hard.

To make artificial stone I take one (1) part of hydraulic cement and one (1) part of fine sharp sand and mix them thoroughly together. The mixture is then dampened with the solution, care being taken that every particle of the sand and cement is moistened. This will prevent it sticking to the mold. The bottom of the mold is carefully covered with this material, and then a shell is placed on the sides, leaving a hollow space within. This hollow space is preferably filled with a coarser material consisting of one part of hydraulic cement and twelve parts of gravel, all carefully dampened with the solution. The top of the stone formed is smoothed off by mechanical means. The mold is immediately turned over onto a smooth surface and lifted off from the stone, which is left on the smooth surface. After standing for some six to twelve hours the stone is moistened with solution. Subsequently cold water is sprinkled over it three times a day for three or four days. The resulting compound is a hard durable mass suitable for building purposes, foundations, sidewalks, cellars, malt-floors, &c.

In making artificial marble I take powdered gypsum or hydraulic chalk or calcined plaster, preferably the gypsum, and mix to the consistency of paste with the solution. It is then pressed into suitable molds, where it is allowed to remain until it is hard and dry.

To cheapen the artificial marble I employ a plan similar to that used in cheapening the artificial stone—that is to say, I place a layer of the plastic marble all over the mold and fill the interior with a cheaper substance—viz., a mixture of hydraulic cement and sand in equal parts. The resulting block has the appearance of a solid block of marble, and is equally serviceable. This artificial marble may be molded into desired shape, or while in the plastic state may be applied to walls, floors, statues, &c. When dry, this artificial marble is susceptible of taking a high polish.

When imitations of colored marbles are desired, the different pigments are mingled with the solution and gypsum, and placed on a smooth surface, such as glass, and there manipulated until the desired "marbling" is obtained. This operation is preferably performed in the mold itself, and after the desired result has been attained with the marble the mold is filled with the cheap filling as before.

The artificial stone and the artificial marble produced by the above-described process are hard and durable, and resist the action of heat and cold and acids. They are in every way suited for building purposes, and their beauty makes them highly desirable articles.

What I claim as new and of my invention, and desire to secure by Letters Patent, is—

1. In the manufacture of artificial stone or marble, a solution in water of soda-alum, a sodium salt, soluble glass, bichromate of potash, and ferrous sulphate, substantially as and for the purposes specified.

2. In the manufacture of artificial stone or marble, a solution in water of soda-alum, a sodium salt, soluble glass, bichromate of potash, and ferrous sulphate combined with a mixture of litharge and glycerine to form the liquid compound, as and for the purposes specified.

3. In the manufacture of artificial stone or marble, a solution in water of soda alum, a sodium salt, soluble glass, bichromate of potash, and ferrous-sulphate combined with a mixture of litharge and glycerine to form the liquid compound, and hydraulic cement, sand, and gypsum, chalk or plaster, and colors or coloring-pigments, substantially as and for the purposes specified.

SCOTT MIXER.

Witnesses:
O. M. HILL,
JNO. W. STREHLI.